US012347215B2

(12) United States Patent
Amthor et al.

(10) Patent No.: US 12,347,215 B2
(45) Date of Patent: Jul. 1, 2025

(54) AUTOMATED TRAINING OF A MACHINE-LEARNED ALGORITHM ON THE BASIS OF THE MONITORING OF A MICROSCOPY MEASUREMENT

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 241 days.

(21) Appl. No.: 17/889,550

(22) Filed: Aug. 17, 2022

(65) Prior Publication Data

US 2023/0055377 A1 Feb. 23, 2023

(30) Foreign Application Priority Data

Aug. 20, 2021 (DE) .......................... 102021121635.4

(51) Int. Cl.
*G06K 9/00* (2022.01)
*G06T 7/60* (2017.01)
(Continued)

(52) U.S. Cl.
CPC .............. *G06V 20/698* (2022.01); *G06T 7/60* (2013.01); *G06V 10/764* (2022.01);
(Continued)

(58) Field of Classification Search
CPC .. G06V 20/698; G06V 10/764; G06V 10/774; G06V 10/95; G06V 10/82;
(Continued)

(56) References Cited

U.S. PATENT DOCUMENTS 10,025,902 B2 * 7/2018 Barral .................. A61B 5/7264
11,210,787 B1 * 12/2021 Godrich ................. G16H 70/60
(Continued)

FOREIGN PATENT DOCUMENTS

DE 102020111584 A1 10/2021
DE 102020210592 A1 2/2022
(Continued)

OTHER PUBLICATIONS

Search Report dated Aug. 2, 2022 from German Priority Patent Application No. 10 2021 121 635.4.

*Primary Examiner* — Shervin K Nakhjavan
(74) *Attorney, Agent, or Firm* — Renner, Otto, Boisselle & Sklar, LLP

(57) ABSTRACT

A computer-implemented method comprises the following steps. In one step an image is acquired which is captured in the context of a microscopy measurement and images a sample to be examined. In one step the microscopy measurement is monitored in an automated manner. On the basis of the automated monitoring of the microscopy measurement, one or more labels are created, wherein said one or more labels comprise semantic context information of the microscopy measurement. On the basis of the image as input and said one or more labels as ground truth, a machine-learned algorithm is trained which provides semantic context information on the basis of images captured in the context of microscopy measurements. In a further step a further image is acquired, which is captured in the context of the microscopy measurement or a further microscopy measurement by the microscope and images the sample or a further sample. In a further step the trained machine-learned algorithm is applied to the further image in order to predict further semantic context information for the further image.

23 Claims, 5 Drawing Sheets

(51) Int. Cl.
*G06V 10/764* (2022.01)
*G06V 10/774* (2022.01)
*G06V 10/94* (2022.01)
*G06V 20/69* (2022.01)

(52) U.S. Cl.
CPC ............ *G06V 10/774* (2022.01); *G06V 10/95* (2022.01); *G06T 2207/10056* (2013.01)

(58) Field of Classification Search
CPC .................... G06V 20/693; G06T 7/60; G06T 2207/10056; G06T 2207/20021; G06T 2207/20081; G06T 2207/20084; G06T 2207/20104; G06T 7/11
See application file for complete search history.

(56) References Cited

U.S. PATENT DOCUMENTS

| | | | |
|---|---|---|---|
| 11,594,024 B2* | 2/2023 | Stumpe | G06T 11/60 |
| 12,106,552 B2* | 10/2024 | Ozcan | G06F 18/2155 |
| 2018/0189610 A1* | 7/2018 | Kandemir | G06F 18/24155 |
| 2019/0061049 A1 | 2/2019 | Kubo | |
| 2019/0279362 A1* | 9/2019 | Marrero | G06V 10/764 |
| 2021/0018742 A1* | 1/2021 | Stumpe | G06T 7/62 |
| 2021/0090251 A1 | 3/2021 | Jha et al. | |
| 2022/0091408 A1 | 3/2022 | Amthor et al. | |

FOREIGN PATENT DOCUMENTS

| | | |
|---|---|---|
| DE | 102020124416 A1 | 3/2022 |
| DE | 102020211699 A1 | 3/2022 |
| DE | 102020126610 A1 | 4/2022 |

\* cited by examiner

Tile scan settings of a user

AUTOMATED TRAINING OF A MACHINE-LEARNED ALGORITHM ON THE BASIS OF THE MONITORING OF A MICROSCOPY MEASUREMENT

TECHNICAL FIELD

The present invention relates to a computer-implemented method for a measuring instrument, in particular a method for training a model of an image analysis application on the basis of a measuring process of a measuring instrument.

Furthermore, a corresponding microscope, and also a computer program and an electronically readable data carrier are provided.

TECHNICAL BACKGROUND

Simple operability is becoming more and more important for measuring instruments in order that users can concentrate fully on the sample during the measuring process. Existing solutions that improve the operability of microscopes use machine learning-based algorithms for automatic image analysis. The training of these models is complex, however; in particular, annotations have to be provided manually for the training.

BRIEF SUMMARY OF THE INVENTION

Therefore, there is a need for improved techniques for measuring instruments which overcome or alleviate at least some of the aforementioned limitations and disadvantages.

The solution according to the invention is described below with reference to the claimed methods and also with reference to the claimed data processing devices. Features, advantages or alternative exemplary embodiments can be assigned to the other categories respectively claimed. In other words, the claims for the data processing devices can be improved by features which are described and/or claimed in the context of the methods, and vice versa.

The techniques described herein make it possible to train a machine-learned algorithm on the basis of labels which are derived from normal microscopy operation.

According to one aspect of the invention, a computer-implemented method comprises the following steps.

In one step an image is acquired which is captured in the context of a microscopy measurement and which at least partly images a sample to be examined during the microscopy measurement.

For example, an overview image or alternatively a microscopy image could be acquired.

The microscopy image can be captured by the imaging optical unit of the microscope. The overview image can be captured by a separate camera. The magnification of the microscopy image can in principle be significantly greater than the magnification of the overview image.

In a further step the carrying out of the microscopy measurement is monitored at least partly in an automated manner.

Automated monitoring can comprise monitoring of the microscopy measurement which is carried out in an automated manner, i.e. in a machine-controlled manner without participation of a user. The user can determine or at least influence the progression of the microscopy measurement. This progression of the microscopy measurement can then be monitored in the background. The monitoring thus corresponds to observing the microscopy measurement without influencing the latter.

In some examples, carrying out a microscopy measurement can comprise a plurality of processes in which semantic context information is determined and/or used for carrying out the microscopy measurement. For example, determining semantic context information in the context of the microscopy measurement can be determined by means of one or more further physical or data-analytical methods, which may differ from the microscopy measurement itself. This can comprise for example applying one or more further machine-learned algorithms to data from the one or more further analysis methods. Semantic context information can for example also be determined on the basis of one or more user interactions with the microscope and/or with the sample.

In a further step, on the basis of the automated monitoring of the microscopy measurement, one or more labels are created, wherein said one or more labels indicate semantic context information for the microscopy measurement.

The labels can thus provide a data structure which is used for training the machine-learned algorithm. The labels can comprise one or more values which are indicative of different schematic context information.

In a further step, on the basis of the image as input and one or more labels as ground truth, a machine-learned algorithm is trained which provides semantic context information for images captured in the context of microscopy measurements.

In a further step a further image (e.g. a further overview image) is acquired, which is captured in the context of the microscopy measurement or a further microscopy measurement by the microscope and images the sample or a further sample.

In a further step the trained machine-learned algorithm is applied to the further image in order to predict the semantic context information for the further image.

Strictly speaking, the machine-learned algorithm can predict further labels, which then indicate the semantic context information.

That corresponds to the inference of the semantic context information. By way of the prediction of the semantic context information, the machine-learned algorithm can thus assist a user when carrying out microscopy measurements.

That means, therefore, that the newly trained machine-learned algorithm can continue to be used in the further progression of the same microscopy measurement and/or can be used for further subsequent microscopy measurements.

The techniques disclosed thus enable annotations for training a machine-learned algorithm to be generated automatically during a measuring process instead of manually, as a result of which time and effort for the measurement can be reduced further.

A special reference measurement or a reference experiment is not necessary. Rather, the training can be effected in the background of the microscopy measurement by way of the monitoring thereof.

The training can be effected during the microscopy measurement ("online training") or afterwards ("off-line training").

The microscopy measurements can comprise the user interaction between the user and the microscope. The user interaction can comprise for example the positioning of the sample carrier, on which the sample is arranged, in relation to an imaging optical unit of the microscope. The user interaction can comprise for example navigating or zooming in an overview image. The microscopy measurement can comprise for example configuring the microscope, for instance illuminance, employed imaging optical unit, filters, etc. The microscopy measurement can comprise capturing microscopy images or measurement images and/or overview images. The microscopy measurement can comprise configuring the capturing of microscopy images and/or overview images, for instance setting the exposure time, etc. The microscopy measurement can also comprise a digital post-processing of captured microscopy images, for example an evaluation, etc.

Monitoring the microscopy measurement can generally provide monitoring data which indicate such processes or other processes, i.e. which characterize the progression of the microscopy measurement.

The labels can then be determined on the basis of the monitoring data. For example, the monitoring data could comprise position marks of a navigation in an overview image or in association with the positioning of a sample stage or sample holder. The monitoring data could describe specific settings of the microscope, for example an objective used (for instance a specific magnification) or a setting of the illumination or the use of a filter. The monitoring data could comprise a frequency of the image capture by a user.

These monitoring data could then be translated into labels which are used for the training. That means that the label and/or the associated semantic context information can be determined by an evaluation algorithm, for example.

For example, position marks could be translated into a segmentation as label. Said segmentation can then be associated—as semantic context information—with a sample region, a manipulation region, generally a region of interest. For example, the frequency of the image capture or the use of an objective having high magnification could be used to determine a region of interest together with the position marks.

A data processing device for a microscope comprises a computing unit and a storage unit. The storage unit stores instructions which are executable by the computing unit, wherein the microscope is configured, upon the execution of the instructions in the computing unit, to carry out the steps of any desired method or of any desired combination of methods in accordance with the present disclosure.

According to another aspect of the invention, a computer program comprises instructions which, upon the execution of the program by a processor, cause the latter to carry out the steps of any desired method or of any desired combination of methods in accordance with the present disclosure.

According to yet another aspect of the invention, an electronically readable data carrier comprises instructions which, upon execution by a processor, cause the latter to carry out the steps of any desired method or of any desired combination of methods in accordance with the present disclosure.

Technical effects corresponding to the technical effects for the methods in accordance with the present disclosure can be achieved for such a data processing device for a microscope, computer program and electronically readable data carrier.

Although the features described in the above summary and the following detailed description are described in association with specific examples, it should be understood that the features can be used not only in the respective combinations, but also in isolation or in any desired combinations, and features from different examples for the methods, network nodes and IoT infrastructures can be combined with one another and correlate with one another, unless expressly indicated otherwise.

The above summary is therefore intended to give only a brief overview of some features of some embodiments and implementations and should not be understood as a restriction. Other embodiments can comprise features other than those described above.

BRIEF DESCRIPTION OF THE DRAWINGS

The invention is explained in greater detail below on the basis of preferred exemplary embodiments with reference to the accompanying drawings.

In this case, identical reference signs in the figures designate identical or similar elements. The figures are schematic illustrations of various exemplary embodiments of the invention, wherein the elements illustrated in the figures are not necessarily illustrated as true to scale. Rather, the various elements illustrated in the figures are rendered in such a way that their function and general purpose become comprehensible to the person skilled in the art.

DETAILED DESCRIPTION OF THE INVENTION

Figure 1:
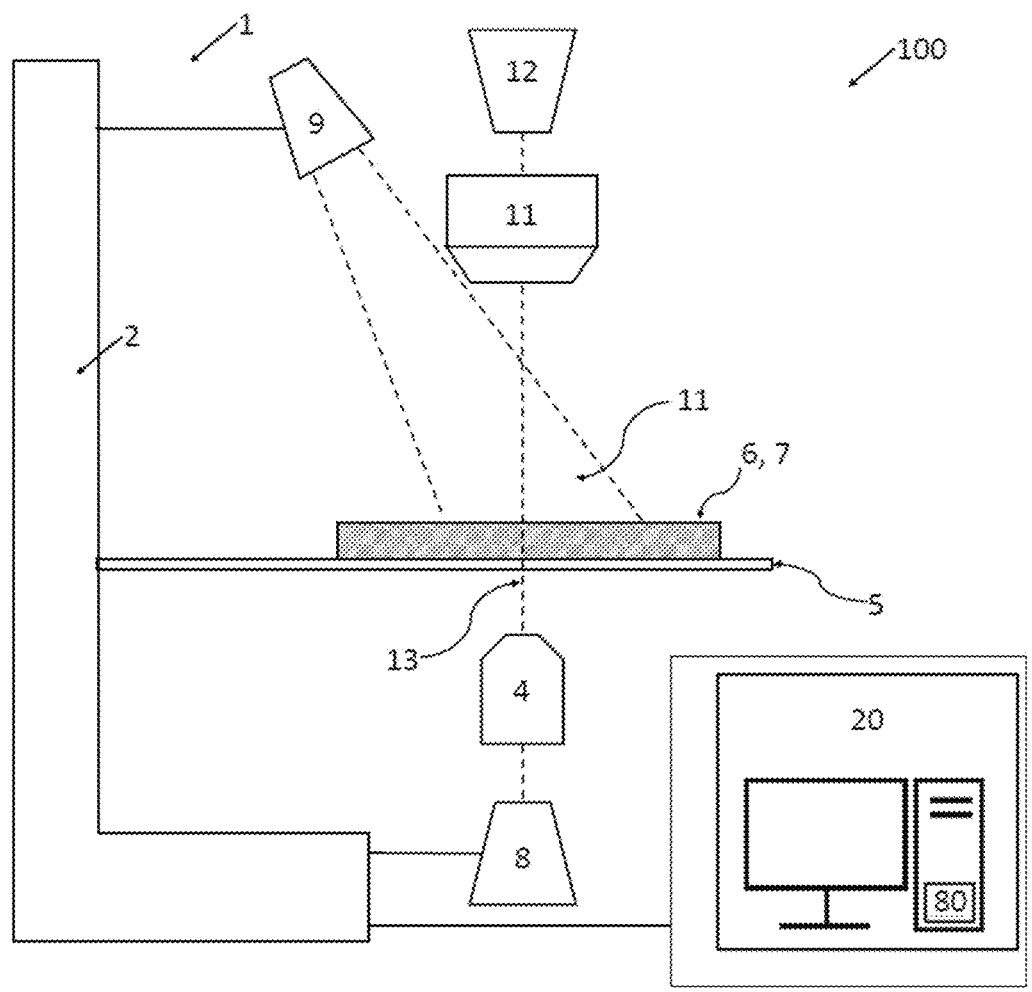
FIG. 1 schematically shows a microscope with an overview camera, in accordance with exemplary embodiments of the invention.

The above-described properties, features and advantages of this invention and the way in which they are achieved will become clearer and more clearly understood in association with the following description of exemplary embodiments which are explained in greater detail in association with the figures.

The drawings should be considered to be schematic illustrations and the elements illustrated in the drawings are not necessarily illustrated as true to scale. Rather, the various elements are illustrated in such a way that their function and general purpose become clear to a person skilled in the art.

It should be noted here that the description of the exemplary embodiments should not be understood in a limiting sense. The scope of the invention is not intended to be restricted by the exemplary embodiments described below or by the figures, which serve merely for illustration.

In the present disclosure, techniques for operating or controlling a measuring instrument, in particular an optical and/or imaging measuring instrument, such as a microscope, for example, are described, which in particular can also be used in the context of any other imaging measurement or examination methods and instruments in which a sample is examined, and wherein a user interacts with the measuring instrument and/or the sample.

Simple operability is becoming more and more important for measuring instruments in order that a user can concentrate wholly on the sample during the measuring process, instead of being unnecessarily concerned with the software and/or hardware.

Important building blocks for increased operability are simplified sample navigation and also automation of certain parts of the workflow. In many examples this is implemented on the basis of a (macroscopic) overview recording of the sample or sample carrier. Such an overview image serves, inter alia, as a kind of "map" on which the customer can recognize and optionally also control the current position of the objective relative to the sample. In addition, such an overview image can be automatically evaluated by image analysis methods in order to be able to select relevant regions more rapidly.

In this case, technical solutions for image analysis are often based on machine learning techniques (in particular deep learning, CNNs). In this particular form of image analysis, firstly a model is trained on the basis of annotated example data. It can subsequently be applied to other data. Annotation means here that, besides the input image to be processed, the desired output also has to be concomitantly provided in the training. In the example of segmentation, this is the desired segmentation mask, for example.

In many machine learning-based applications, the recording of data but in particular also the annotation thereof—for instance by an expert in a reference measurement—requires the greatest expenditure of time and often constitutes the bottleneck. In order that the models used can be continuously and rapidly improved, methods for collecting annotations are therefore greatly advantageous.

Therefore, it is an aim of this disclosure to obtain such annotations or labels during "normal" operation. In some examples, during normal microscope operation, a user interaction with the sample/sample carrier or generally a microscopy measurement is monitored in an automated manner in order to generate therefrom annotation data (labels) for the creation or improvement of image analysis models—i.e. generally a machine-learned algorithm. The microscopy measurement can thus primarily have the aim of examining a sample and obtaining new knowledge about the sample. The progression of the microscopy measurement is thus determined by the user interaction of the user with the microscope and/or a measurement workflow that is intended to obtain measurement data concerning the sample. At the same time, however, it is also possible to derive training data for training a machine-learned algorithm. The progression of the microscopy measurement can thus be independent of the capturing.

Generally, it is possible for the machine-learned algorithm to be trained repeatedly in successive microscopy measurements in this way. That means that continuous training is possible during the operation of the microscope. The training state of the machine-learned algorithm can be improved from microscopy measurement to microscopy measurement as a result. That is sometimes also referred to as "lifelong learning".

Each individual training process can build on a preceding training state, for example. That means that the machine-learned algorithm can already be pre-trained. That means that the machine-learned algorithm can already be used for assisting the user during the microscopy measurement in the pre-trained state; parameters of the machine-learned algorithm can then be adapted further during training, proceeding from said pre-trained state. However, it would also be conceivable for the machine-learned algorithm not to be pre-trained or for the carrying out of the training to be preceded by the parameter values being re-initialized in a starting state, for example by random setting of parameter values.

Moreover, it would be conceivable to accumulate labels which are determined by the monitoring of a plurality of microscopy measurements, e.g. on different samples. That means that the training of the machine-learned algorithm can also be based on one or more further images associated with one or more earlier microscopy measurements.

FIG. 1 schematically shows a microscope with an overview camera, in accordance with exemplary embodiments of the invention.

The microscope 1 comprises a light source 12 and a condenser 11 for illuminating a sample 7 arranged in a sample carrier 6 and positioned on a sample stage 5. Detection light emanating from the sample 7 is guided to a camera 8 along an optical axis 13 by way of an objective 4 for recording a sample image.

An overview camera 9 is held on the microscope stand 2, and enables an overview image of the sample 7 to be recorded. In an alternative configuration, provision can also be made for the overview camera 9 to record the overview image via a mirror (not shown).

A control unit or data processing device 20 having a computing device 80 is designed to process a recorded microscope image (that is to say a sample image or overview image), inter alia in order to perform an image analysis. The computing device 80 is designed here to carry out a method or any desired combination of methods in accordance with the present disclosure.

The computing device 80 can also be used in a different microscope which, in contrast to the microscope illustrated, for example, operates according to a different measurement principle or is a scanning or electron microscope. In devices other than microscopes, too, a computing device as described here can be provided for image analysis purposes.

Figure 2:
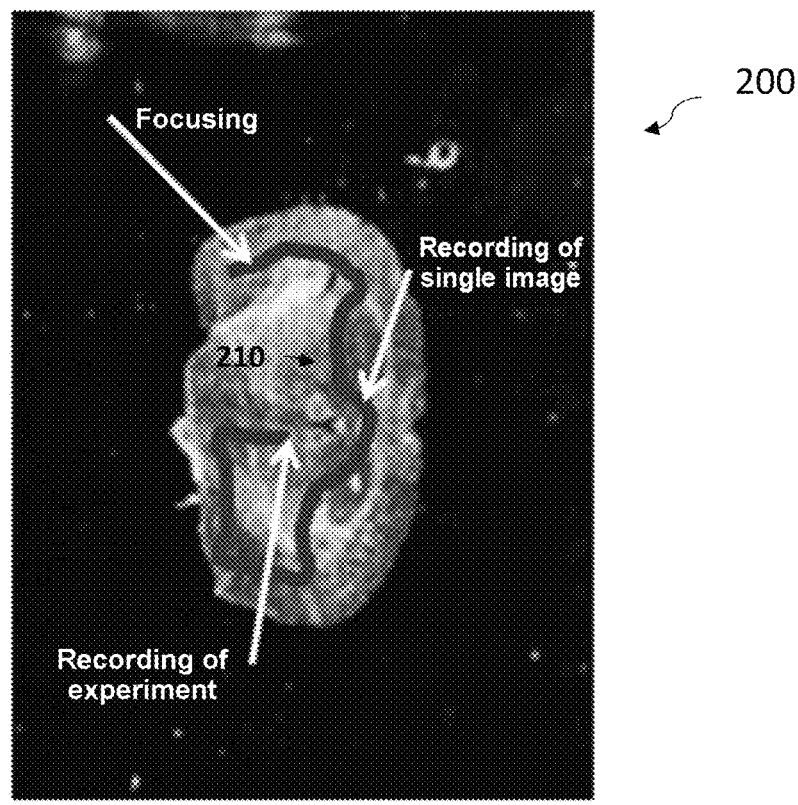
FIG. 2 shows user interactions with a sample in an overview image, in accordance with exemplary embodiments of the invention.

FIG. 2 schematically shows user interactions with a sample in an overview image 200, in accordance with exemplary embodiments of the invention.

FIG. 2 shows the overview image 200 of a sample, wherein user interactions on the sample are additionally illustrated in the overview image 200. In particular, a trajectory 210 of the user, and also user actions carried out at some places of particular interest are marked by arrows. From this information it is possible firstly to train models which can find e.g. sample regions of interest/regions suitable for focusing/regions suitable for experiments, on the basis of the position of the respective user actions.

A plurality of user interactions can be observed/recorded, for example an observed position on the sample carrier, and/or a dwell time at the respective position, and/or a field of view, determined e.g. by a selected objective.

What can furthermore be observed/recorded as a user interaction are for example user actions carried out, such as one or more of an image recording, such as, for instance, a single image, a time series, or tiling recording of one or more partial regions of the sample and/or of the overview image, measurement in the overview image, such as, for example, of a width of a cell, performing a processing, such as, for example, cell counting or confluence determination, annotation, such as, for example, drawing, altering, erasing a polygon or a circle or a bounding box or a marker or the like around a relevant region in the overview image, switching to different contrast or filter or magnification, changing microscope parameters, such as, for example, laser power or illumination, and focusing in a partial region in the overview image.

It is possible to derive therefrom annotations for one or more arbitrary image analysis applications, for example, for which a machine learning model can then be trained, for example, in order to determine one or more of the following items of semantic context information. A determination of the sample carrier type, such as, for example, on the basis of concrete user actions, a determination of the quality of the sample carrier, such as, for example, when a customer places a sample on the sample carrier, moves to different positions on the sample and places the sample afterwards again after it has been cleaned, a segmentation of sample regions and coverslip regions, a detection of relevant/conspicuous sample regions, for example regions where there is a long dwell time on the part of the customer, suitable sample positions for a calibration, such as, for example, regions at which the customer often carries out calibration, a focusing and centring, a setting of microscope parameters, such as, for example, automatic recognition of sample regions at which bleaching can occur for the purpose of microscope parameter setting, setting up of experiments, and/or recording of data for the training of machine learning models.

The annotations can be weak or else strong annotations, for example. Weak annotations can comprise e.g. knowledge that there was a long dwell time at a position. Strong annotations can comprise e.g. polygons around relevant regions.

Figure 3:
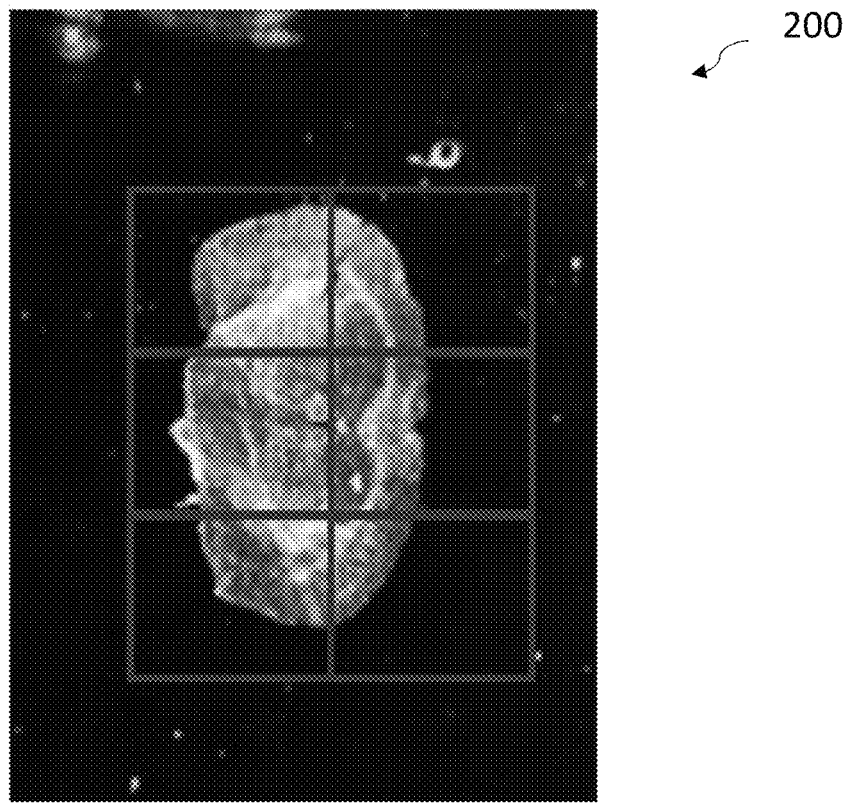
FIG. 3 schematically shows a segmentation of an overview image performed by a user, in accordance with exemplary embodiments of the invention.

FIG. 3 schematically shows a segmentation of an overview image 200 performed by a user, in accordance with exemplary embodiments of the invention.

FIG. 3 shows semantic context information input by a user for the measurement, in this example an effected setting of a tile scan of the sample. The tile scan can then be carried out on the sample in the context of the microscopy measurement. With the aid of this information, it is additionally possible to train a segmentation model, for example, which can find sample regions.

The semantic context information input by the user and annotations collected in this way can then be used for example for the following steps. Supervised learning, unsupervised learning or reinforcement learning of machine learning models, "lifelong learning" (LLL), wherein a model is constantly improved (i.e. from microscopy measurement to microscopy measurement), training of models directly by the customer or collection of the data and training of a central model which can be provided for individual users, user groups or a plurality of users. In this context, models which have been provided centrally can be trained locally for specific users and/or can be stored centrally or in a decentralized manner. By way of example, a corresponding trained model could be transmitted to a central server.

The techniques disclosed allow annotations to be generated automatically instead of manually, as a result of which time and effort for the measurement can be reduced. Furthermore, in the case of combined implementation of the methods for training and for applying the models by way of "lifelong learning", a model is constantly improved, instead of remaining at the level after delivery.

Figure 4:
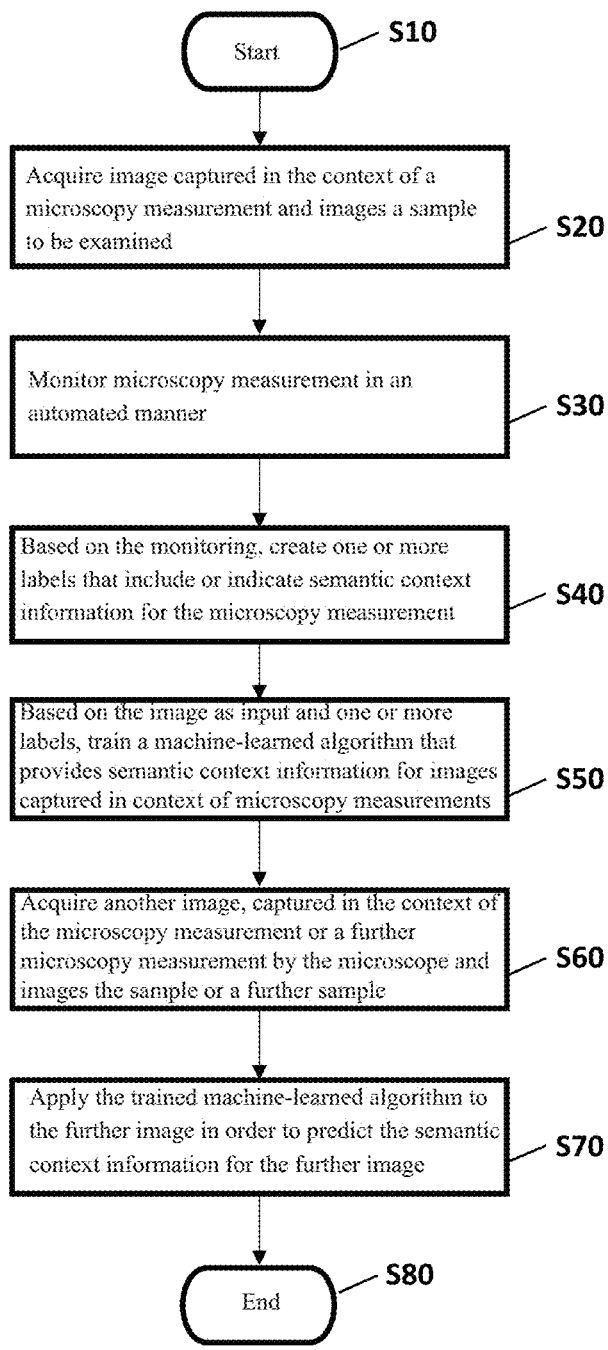
FIG. 4 shows a flow diagram with steps, in accordance with exemplary embodiments of the invention.

FIG. 4 shows a flow diagram with steps for operating a microscope, in accordance with exemplary embodiments of the invention.

The method begins in step S10. In step S20 an image is acquired which is captured in the context of a microscopy measurement and images a sample to be examined. The image could be an overview image.

In step S30 the microscopy measurement is monitored in an automated manner.

That means that the progression of the microscopy measurement can be predefined by other determining variables—typically a user interaction and/or a measurement protocol —; and the monitoring merely constitutes an observation of the progression.

By way of example, a temporal progression of the microscopy measurement can be represented by monitoring data. The latter could be provided with time stamps. The monitoring data could indicate a setting of the microscope and/or user actions.

In step S40, on the basis of the automated monitoring, one or more labels are created, wherein said one or more labels comprise or indicate semantic context information for the microscopy measurement.

That could be effected e.g. on the basis of the monitoring data. A pre-processing algorithm can evaluate the latter. By way of example, a time dependence of the monitoring data could be analysed.

By way of example, a time dependence of monitoring data could be used in order to create said one or more labels. By way of example, a check could be made to ascertain sample regions in which position marks of the monitoring data indicate a particularly long dwell time. By way of example, a check could be made to ascertain sample regions in which an objective having a particularly high magnification factor is used.

For example, monitoring data indicating different characteristics of the microscopy measurement could be fused with one another in order to create said one or more labels. For example, monitoring data indicating position marks could be combined with monitoring data indicating the objective used or the use of a specific filter.

It is thus evident from the above that said one or more labels need not be expressly specified, but rather can be derived as a hidden observable from the microscopy measurement.

In step S50, on the basis of the image as input and one or more labels as ground truth, a machine-learned algorithm is trained which provides semantic context information for images captured in the context of microscopy measurements.

This can be done using techniques that are known in principle, e.g. gradient descent methods/backpropagation for a neural network.

In step S60 a further image is acquired, which is captured in the context of the microscopy measurement or a further microscopy measurement by the microscope and images the sample or a further sample.

In step S70 the trained machine-learned algorithm is applied to the further image in order to predict the semantic context information for the further image.

Generally, the semantic context information can render different items of information. For example, the semantic context information could be indicative of a region of interest. The semantic context information could mark the sample. The semantic context information could mark a manipulation region of the sample. The semantic context information could also relate to global parameters, for example an image quality. The semantic context information could describe a sample type, for example.

The method ends in step S80.

Figure 5:
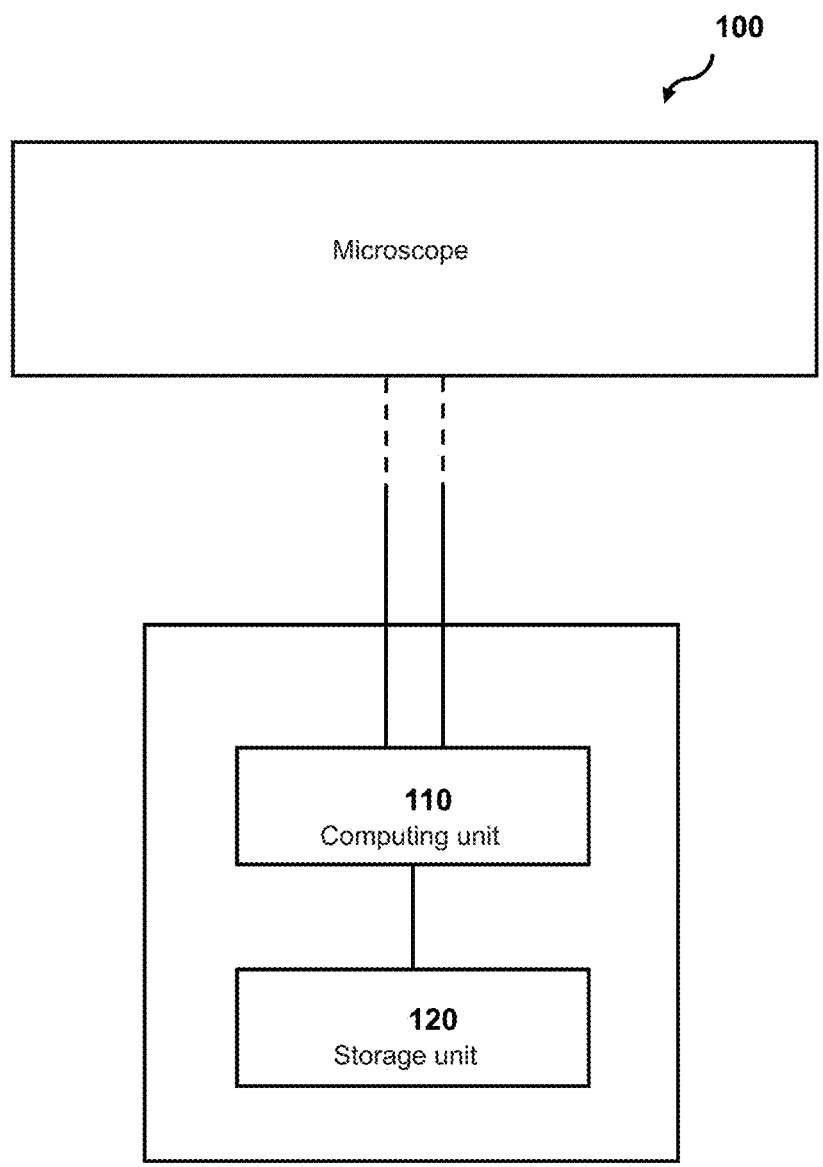
FIG. 5 shows a data processing device for a microscope with which a method according to the invention can be carried out.

FIG. 5 shows a data processing device for a microscope 100 with which a method according to the invention can be carried out, in accordance with exemplary embodiments of the invention.

The microscope 100 is connected to a data processing device comprising a computing unit 110 and a storage unit 120, wherein the storage unit 120 stores instructions that are executable by the computing unit 110, and wherein the data processing device is configured to carry out the steps of one of the methods or of any desired combination of methods according to the present disclosure upon the execution of the instructions in the computing unit 110.

Some general conclusions can be drawn from the statements above:

The methods can preferably be realized in a computer-aided manner, i.e. in a computer-implemented and/or automated manner.

In some examples, a machine-learned algorithm can comprise an end-to-end trained model, and include a plurality of parameters. The machine-learned algorithm can receive an image as input and, on the basis thereof, can directly output, as output, semantic context information for a measurement with the measuring instrument. An application of a trained model can be carried out by a neural network, which can comprise a plurality of classification functions. In various examples, a trained model can comprise one or more known classifiers for machine learning. Without restriction, the trained functions can be based e.g. on one or more of a support vector machine, a decision tree and/or a Bayesian network, k-means clustering, Q-learning, genetic algorithms and/or association rules. Without restriction, a neural network can comprise a deep neural network, a convolutional neural network or a convolutional deep neural network, an adversarial network, a deep adversarial network and/or a generative adversarial network or a model-based machine learning network architecture.

Automated monitoring of a microscopy measurement can comprise determining a sample type and/or a degree of contamination of the sample. By way of example, a transformation between pose and microscopy image can be carried out, wherein an overview image can be calibrated. An overview image can be recorded by means of a separate overview camera. A further algorithm can be used to search for a stain concentration in the overview image, wherein the algorithm finds structures that accept stain. That can be macroscopically mirrored back to the corresponding partial regions, which can be highlighted as semantic context information.

Automated monitoring of the microscopy measurement can comprise automated monitoring of an automated analysis operation.

Various analysis operations are conceivable here. For example, in the case of a biological sample comprising a plurality of cells, cells could be counted. It could then be established, for example, whether different cell densities are present in different partial regions of the sample and a corresponding segmentation could be used as label. It could be established, for example, whether different cell types are present in different partial regions of the sample. Other analysis operations can identify contamination, for example. Analysis operations can identify luster points, for example, at which the contrast is overdriven and a quality of the image is thus reduced.

The analysis operation could provide a segmentation of a microscopy image, for example. For example, the analysis operation could highlight specific partial regions in the microscopy image. The user could then carry out a correction of the output of the analysis operation, for example of the segmentation. The label could be determined on the basis of such a correction, for instance because the corresponding region was then checked by the user and is provided with a particular importance.

It would be conceivable for the analysis operation to be implemented by the machine-learned algorithm in a preceding training state. That means that the result of the analysis operation can correspond to the predicted label of the machine-learned algorithm in the preceding training state. If this label is corrected, this correction can be used for the retraining of the machine-learned algorithm. In this way, the training state of the machine-learned algorithm can be gradually improved.

A label can comprise a data structure which represents the output of the machine-learned algorithm. Said data structure can indicate or comprise schematic contact information. A label can encode semantic context information.

Said one or more labels can be determined on the basis of a result of the automated analysis operation.

The semantic context information and/or the further semantic context information can indicate a global property of the sample or of the further sample.

The semantic context information and/or the further semantic context information can indicate an image quality of the microscopy measurement.

The semantic context information and/or the further semantic context information can indicate a degree of cleanness of the sample or of the further sample.

The semantic context information and/or the further semantic context information can mark one or more partial regions of the sample or of the further sample.

Said one or more partial regions of the sample or of the further sample can be associated with one or more proposed user interactions.

Semantic context information comprises data which are used when carrying out the microscopy measurement and/or for controlling the microscopy measurement.

Semantic context information comprises data which qualitatively and/or quantitatively characterize the microscopy measurement and/or the microscope and/or the sample and/or the image as a whole and/or parts of the image.

A trained model can be stored or assigned together with further information with respect to a sample type of the sample and a specific measuring process, such as, for example, user or use group identification and/or microscope settings (relevant parameters).

The user interaction can relate to one or more partial regions of the sample. The labels and the semantic context information can relate to and be associated with only one partial region or a plurality of partial regions. The labels could thus include e.g. a corresponding segmentation of the image.

Said one or more labels can be determined on the basis of a relative imaging frequency or imaging duration of the different partial regions during the measurement. The relative imaging frequency could be indicated in monitoring data. Partial regions which are imaged frequently can mark e.g. a region of interest.

Said one or more labels can be determined on the basis of user-initiated analysis operations regarding properties of the sample for said one or more partial regions.

Said one or more labels can be determined on the basis of user-initiated measurement protocol steps of the measurement for said one or more partial regions. By way of example, a measurement protocol step could comprise capturing measurement images or evaluating measurement images or manipulating the sample.

Said one or more labels can be determined on the basis of user-initiated setting changes of imaging parameters of the microscope during imaging of said one or more partial regions.

Said one or more partial regions can be determined on the basis of a field of view of the microscope.

Said one or more partial regions can be determined on the basis of a user segmentation of a microscopy image, or image of the imaging method, in the context of an analysis operation.

An overview image can be captured by an overview camera separate from the measuring device. The overview image can have a lower spatial resolution than the microscopy measurement, in particular can be generated by an optical imaging system independently of the measuring method. The overview image can represent a position of an objective of the microscope relative to the sample. The user interaction can comprise an observed position on the sample. The user interaction can comprise an implemented user action and/or user input during the measuring process by means of the microscope and/or on the sample.

In general, examples of the present disclosure provide a plurality of circuits, data storage units, interfaces or electrical processing devices, e.g. processors. All references to these units and other electrical devices and also the functions provided by them are not restricted to what is illustrated and described. While specific designations can be assigned to the various circuits or other electrical devices disclosed, these designations are not intended to restrict the functional scope of the circuits and of the other electrical devices. Said circuits and other electrical devices can be combined with one another and/or separated from one another, depending on the desired type of electrical implementation. It should be understood that any disclosed circuit or other electrical device can comprise any desired number of microcontrollers, graphics processing units (GPUs), integrated circuits, storage devices, e.g. FLASH, random access memory (RAM), read only memory (ROM), electrically programmable read only memory (EPROM), electrically erasable programmable read only memory (EEPROM), or any other suitable embodiments thereof, and also software, which cooperate with one another in order to carry out the method steps disclosed herein. Furthermore, each of the electrical devices can be configured to execute program code which is contained in an electronically readable data carrier and which is configured to carry out any desired number of steps in accordance with the methods of the present disclosure.

In summary, a method is presented as to how annotation data can be acquired during the normal operation of a microscope system. As a result, it is possible, in particular, for annotations for training machine-learned algorithms to be generated automatically, and for the algorithms to be locally improved, as a result of which time and effort for the measurement can be reduced further. In particular, a machine-learned algorithm can be trained to predict semantic context information for a microscopy measurement on the basis of an image and/or on the basis of user interactions.

A description has been given above of techniques which make it possible to predict semantic context information on the basis of overview images, wherein the overview images are captured in the context of a microscopy measurement. In general terms, the techniques described herein can also be applied to microscopy images captured in the context of the microscopy measurement. That means that semantic context information can alternatively or additionally also be determined on the basis of microscopy images with a comparatively high degree of magnification, for example more than fivefold or tenfold magnification. For example, in microscopy images specific features which are helpful for the microscopy measurement could be extracted, e.g. sample edge regions could be annotated, etc.

Although the invention has been shown and described with reference to specific preferred exemplary embodiments, equivalents and modifications will be implemented by those skilled in the art after reading and understanding the description. The present invention encompasses all such equivalents and modifications and is limited only by the scope of the accompanying claims.

What is claimed is:

1. A computer-implemented method, comprising:
controlling a microscope to acquire an image which is captured in the context of a microscopy measurement and images a sample to be examined;
determining at least one of a setting of the microscope or a user action by automated monitoring of the microscopy measurement;
on the basis of the at least one of the setting of the microscope or the user action, creating one or more labels, wherein said one or more labels indicate semantic context information for the microscopy measurement;
on the basis of the image as input and one or more labels as ground truth, training a machine-learned algorithm which provides semantic context information for images captured in the context of microscopy measurements,
acquiring a further image, which is captured in the context of the microscopy measurement or a further microscopy measurement by the microscope and images the sample or a further sample, and
applying the trained machine-learned algorithm to the further image in order to predict further labels indicating semantic context information for the further image.

2. The method according to claim 1, wherein said automated monitoring of the microscopy measurement comprises automated monitoring of a user interaction with the microscope and/or the sample in the context of the microscopy measurement, and wherein said one or more labels are created on the basis of the user interaction.

3. The method according to claim 2, wherein the user interaction relates to one or more partial regions of the sample.

4. The method according to claim 1, wherein said one or more labels are associated with the one or more partial regions of the sample.

5. The method according to claim 4, wherein said one or more labels are determined on the basis of user-initiated analysis operations regarding properties of the sample for said one or more partial regions.

6. The method according to claim 4, wherein said one or more labels are determined on the basis of user-initiated measurement protocol steps of the microscopy measurement for said one or more partial regions.

7. The method according to claim 4, wherein said one or more labels are determined on the basis of a user-initiated setting changes of imaging parameters of the microscope during imaging of said one or more partial regions.

8. The method according to claim 4, wherein said one or more partial regions are determined on the basis of a field of view of the microscope.

9. The method according to claim 4, wherein said one or more partial regions are determined on the basis of a correction of a segmentation of an analysis operation of a microscopy image.

10. The method according to claim 1, wherein said one or more labels are determined on the basis of a relative imaging frequency or imaging duration of different partial regions during the microscopy measurement.

11. The method according to claim 1, wherein said automated monitoring of the microscopy measurement comprises automated monitoring of an automated analysis operation, and wherein said one or more labels are determined on the basis of at least one of a result of the automated analysis operation, or on correction of the analysis result of the automated analysis operation.

12. The method according to claim 11, wherein the automated analysis operation is implemented by the machine-learned algorithm in an earlier training state before training.

13. The method according to claim 1, wherein the further semantic context information indicates a global property of the sample or of the further sample.

14. The method according to claim 1, wherein the further semantic context information indicates an image quality of the microscopy measurement.

15. The method according to claim 1, wherein the further semantic context information indicates a degree of cleanness of the sample or of the further sample.

16. The method according to claim 1, wherein the further semantic context information indicates a sample carrier type.

17. The method according to claim 1, wherein the further semantic context information indicates a suitable position for a further user interaction to be carried out.

18. The method according to claim 1, wherein training the machine-learned algorithm is furthermore based on a further image as input and one or more further labels as ground truth, which are associated with an earlier microscopy measurement.

19. The method according to claim 1, wherein the method furthermore comprises:
    transmitting the trained machine-learned algorithm to a central server.

20. The method according to claim 19, wherein determining said one or more labels on the basis of the monitoring data is dependent on a time dependence of the monitoring data and/or is dependent on monitoring data relating to different characteristics of the microscopy measurement.

21. The method according to claim 1, wherein said automated monitoring of the microscopy measurement comprises generating monitoring data indicating a temporal progression of the microscopy measurement, wherein the method furthermore comprises:
    determining said one or more labels on the basis of the monitoring data.

22. A computer program embodied on a non-transitory computer-readable medium, comprising instructions which, upon the execution of the program by a processor, cause the latter to carry out the steps of claim 1.

23. A Data processing device for a microscope, comprising a computing unit and a storage unit, wherein the storage unit stores instructions that are executable by the computing unit, and wherein the microscope is configured to carry out the following steps upon the execution of the instructions in the computing unit:
    controlling a microscope to acquire an image which is captured in the context of a microscopy measurement and images a sample to be examined;
    determining at least one of a setting of the microscope or a user action by automated monitoring of the microscopy measurement;
    on the basis of the at least one of the setting of the microscope or the user action, creating one or more labels, wherein said one or more labels indicate semantic context information for the microscopy measurement;
    on the basis of the image as input and one or more labels as ground truth, training a machine-learned algorithm which provides semantic context information for images captured in the context of microscopy measurements,
    acquiring a further image, which is captured in the context of the microscopy measurement or a further microscopy measurement by the microscope and images the sample or a further sample, and
    applying the trained machine-learned algorithm to the further image in order to predict further semantic context information for the further image.

* * * * *